(No Model.)
E. J. WILLIS.
PLANIMETER.
No. 529,008. Patented Nov. 13, 1894.
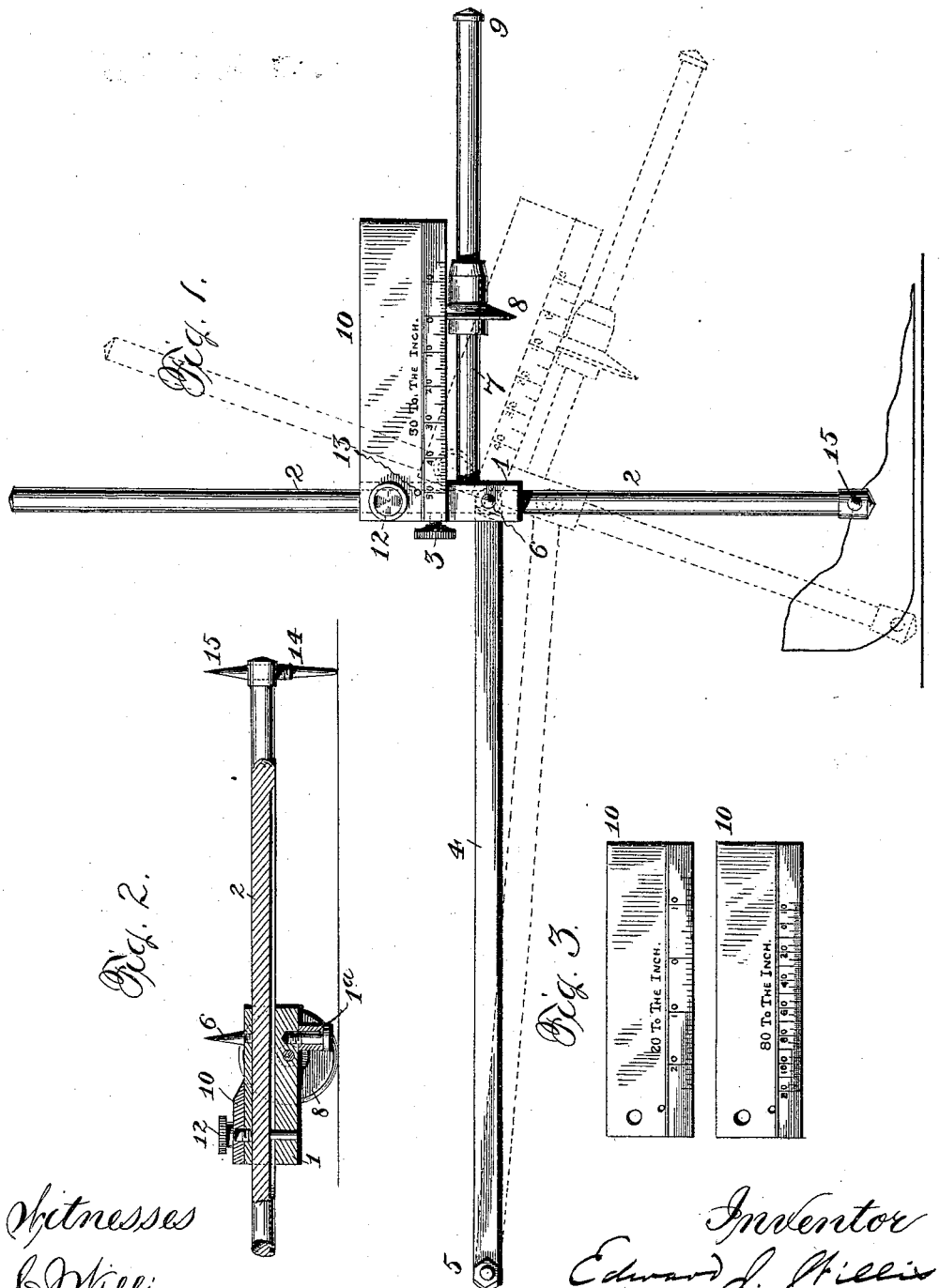
Witnesses
C. J. Williamson
Alfred T. Gage
Inventor
Edward J. Willis
by Wm. B. Henderson
Attorney

UNITED STATES PATENT OFFICE.

EDWARD J. WILLIS, OF RICHMOND, VIRGINIA.

PLANIMETER.

SPECIFICATION forming part of Letters Patent No. 529,008, dated November 13, 1894.

Application filed August 2, 1894. Serial No. 519,254. (No model.)

*To all whom it may concern:*

Be it known that I, EDWARD J. WILLIS, a citizen of the United States, residing at Richmond, in the county of Henrico and State of Virginia, have invented certain new and useful Improvements in Planimeters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain improvements in polar planimeters for ascertaining areas and determining the mean effective pressure and horse power of steam indicator diagrams.

It is the aim of my invention to simplify and improve the construction and operation of apparatus of this type in such manner as to enable the user to read the mean effective steam pressure or horse power direct from the scale attached to the instrument, without calculation of any kind and without application of measurements to the diagram.

It is my purpose, also, to provide means whereby the instrument may be used to determine mean effective pressures, horse powers, or irregular areas, upon different scales of measurement, and my invention consists in the novel features of construction and new combination of parts hereinafter fully described and then particularly pointed out and defined in the claims.

To enable those skilled in the art to which my said invention pertains to fully understand the same, I will describe said invention in detail, reference being had, for this purpose, to the accompanying drawings, in which—

Figure 1 is a plan view, showing a planimeter constructed in accordance with my invention and applied to a steam indicator diagram to ascertain the mean effective pressure indicated; the dotted lines indicating a second position of the parts. Fig. 2 is a partial sectional view of the parts shown in Fig. 1 taken in the line of the tracer bar; and Fig. 3 is a detail view showing different, interchangeable scales, constructed for application to the planimeter, to adapt it to be used upon diagrams taken with springs of different scale.

The reference numeral 1 in said drawings indicates the frame of the instrument, consisting substantially of a plain, rectangular housing, having a longitudinal opening which receives the tracer-bar 2. A set-screw 3 fastens the latter at any point to which it may be adjusted in the frame, the latter being open at both ends to allow the maximum longitudinal movement of the tracer-bar. In a boss dropped from the lower side of the frame 1 is a pivoted axis $1^a$ for the end of the fulcrum-bar 4, the other extremity of the latter being provided with a sharp point 5, of steel or other suitable metal, the body of which is extended through and rises above the end of the bar. Projecting from the upper side of the frame 1 is a small, conical point 6, having its apex in the same straight line with the axis upon which the end of the fulcrum-bar 4 is mounted.

The reference numeral 7 indicates a fixed shaft which extends from the side of the frame 1, opposite that upon which the fulcrum-bar 4 lies, the axis of the shaft being at an angle of ninety degrees with the longitudinal line of the frame and tracer-bar. Upon this shaft is placed the measuring wheel 8, accurately fitting the shaft, but capable of turning freely and moving longitudinally from end to end thereof, the end of the shaft being provided with a slight enlargement 9, which prevents the wheel from passing off. The periphery of the latter is beveled off to an edge not keen enough to cut, but having such a sharp definition that it may readily be placed in exact co-incidence with the graduations of a linear scale.

An attachable and detachable scale 10 is mounted upon the upper side of the frame 1, to which it is rigidly secured by a thumb-screw 12 passing through an opening in its end and tapped into the metal of the frame. A dowel, or nipple 13, rising from the frame near the thumb-screw, enters a small aperture in the scale and determines the exact position of the same, its graduated edge lying in parallelism with the axis of the shaft 7 and in close proximity to, but just removed from actual contact with, the edge of the measuring wheel 8.

I provide a series of different scales, two of which are shown in Fig. 3 of the drawings. These scales differ from each other only in graduation, this being varied to correspond with the various measurements for which the instrument is adapted. For example, one series may be graduated to correspond to the different scales of springs with which indicator diagrams are taken, others may be so graduated as to read directly the horse power of certain engines when running at a given speed and the indicator card taken with a specified spring, thus saving the usual tedious calculation of horse power, while other scales may be graduated to conform to cubic measurement, or, if desired, to the metric and other systems used abroad.

The end of the tracer-bar is supplied with a tracing point 14, projecting from its lower surface. Upon the upper face of the same bar is a nipple 15, used in guiding the tracing point. The end of this nipple is tapered to a point which lies in the same axial line with the tracing point and which serves, in conjunction with the conical point 6, to fix the adjustment of the tracer-bar in the frame 1.

When the planimeter is used for determining the mean effective pressure of an indicator diagram the scale corresponding to the spring used in taking the diagram is attached to the instrument. Thus supposing the indicator card to have been taken with a thirty pound scale then the scale with thirty graduations to the inch is attached to the instrument. The tracer-bar is then moved longitudinally in the frame 1 until the point of the nipple 15 and the conical point 6 are brought into coincidence with the length of the diagram to be measured. The fulcrum-bar 4 being then extended and at its point 5 caused to pierce the surface on which the instrument rests, the measuring wheel 8 is moved along the shaft 7 until its edge coincides with the zero mark on the graduated scale, which is preferably arranged in, or near, the central part of the graduated edge. The tracing point is then caused to follow the diagram accurately, beginning at any point, care being taken to see that the measuring wheel remains in contact with the surface over which it moves. This contact communicates rotary movement to the wheel and causes it to traverse the shaft 7 longitudinally, in both directions, its edge moving, as it recedes from, or approaches the frame 1, over the scale 10. When the tracing point 14 returns to its point of departure on the diagram, the edge of the wheel will coincide with a graduation of the scale indicating in pounds the mean effective pressure. The fractions of a pound may be denoted by a vernier.

Prior to my invention planimeters have employed measuring wheels having rotary movement, the indications given thereby being merely the height of the line denoting the mean effective pressure on the diagram. So far as I am aware there has been no provision made, heretofore, for reading the mean effective pressure in pounds and fractions of a pound, direct from the scale of the instrument. Neither am I aware of any instance in which the instrument has been so organized as to permit the use of interchangeable scales, or the reading of horse powers directly from the instrument. As the indicator scales are obtainable at a small cost and are readily fitted, the expense of manufacture is not materially increased and the usefulness of the instrument is largely increased while its accuracy is strictly preserved.

The equation upon which the instrument is organized, according to my invention, is substantially as follows: If A be taken to represent the superficial area of a diagram, M denoting the movement of the measuring wheel, and L the length of the tracer-arm (which is adjusted to the length of the diagram), then $A = M \times L$, and the mean effective pressure will be equal to $\frac{A}{L}$. Representing this pressure by the letters M.E.P., the equation will read $M.E.P. = \frac{A}{L}$, or, clearing the denominator, $A = (M.E.P.)L$. Substituting $(M.E.P.)L = M \times L$, whence, $M.E.P. = M$; that is to say, the mean effective pressure is equal to the movement of the measuring-wheel which is read in pounds per square inch by the same scale as that of the spring with which the card is taken. Thus if the card be taken with a fifty pound spring then the mean effective pressure (M) is measured in pounds per square inch by a scale with fifty graduations to the inch.

When used for measuring areas the points 6 and 15 are set apart the distance corresponding to the scale which is attached to the instrument. Thus, if a scale with thirty graduations to the inch be on the planimeter, the points 6 and 15 are set three inches apart and the areas read in square inches. If the scale with one hundred graduations to the inch be attached, then the points 6 and 15 should be ten inches apart and reading will be in square inches. Similarly for foreign measures and if a centimeter scale were attached with ten graduations per centimeter and points 6 and 15 be ten centimeters apart it would read in square centimeters.

To obtain horse power direct from the scale it is necessary to have a scale or set of scales so graduated as to read the horse powers of the engine or engines from which the cards are taken with a specified spring. Thus if we had a card taken with a fifty pound spring from a twelve inch by eighteen inch engine running at one hundred and forty-eight revolutions per minute and we were to use a scale with seventy-five graduations per inch the reading of the instrument would be the horse power of the engine. For the constant by which we would multiply its mean effective pressure to obtain its horse is power 1.5 and since as per previous paragraphs a scale with fifty graduations to the inch would read the mean effective pressure a scale with seventy-five graduations to the inch would read 1.5 times the mean effective pressure which is the horse power.

I am not confined to the particular form of the scale employed nor to the manner in which the scales are secured in place nor in which they are rendered interchangeable or replaceable as various forms may be employed in which will be embodied the feature of replaceability or interchangeability of scales.

Having described my invention and set forth its merits, what I claim is—

1. A polar planimeter comprising a measuring-wheel having rotary and longitudinal movement on a fixed shaft, a fulcrum-bar, and a graduated scale over the straight edge of which the periphery of the wheel moves, substantially as and for the purposes set forth.

2. A polar planimeter comprising a measuring-wheel having rotary and longitudinal movement on a fixed shaft, a fulcrum-bar, and a scale replaceably attached to the frame to permit an interchange of scales and over the straight edge of which the periphery of the wheel moves, substantially as and for the purposes set forth.

3. A polar planimeter having a measuring wheel loosely mounted on a fixed shaft at right angles to the tracer-arm, and a replaceable scale adapted to be mounted on the frame in parallelism with said fixed shaft, and to be replaced by a different scale substantially as and for the purposes set forth.

4. In a polar planimeter, the combination with a frame, of a pivotally attached fulcrum-bar, a longitudinally adjustable tracer-arm, a measuring wheel turning and moving longitudinally upon a shaft at right angles to the tracer-arm, and an attachable and detachable scale mounted on the frame with its straight graduated edge lying in close proximity to the edge of the measuring wheel and in parallelism with its shaft, substantially as and for the purposes set forth.

In testimony whereof I affix my signature in presence of two witnesses.

EDWARD J. WILLIS.

Witnesses:
W. F. TOMPKINS,
HORACE S. COOPER.